Sept. 1, 1925.
C. B. LATENDORF
CONVEYER
Filed Oct. 13, 1924
1,552,319
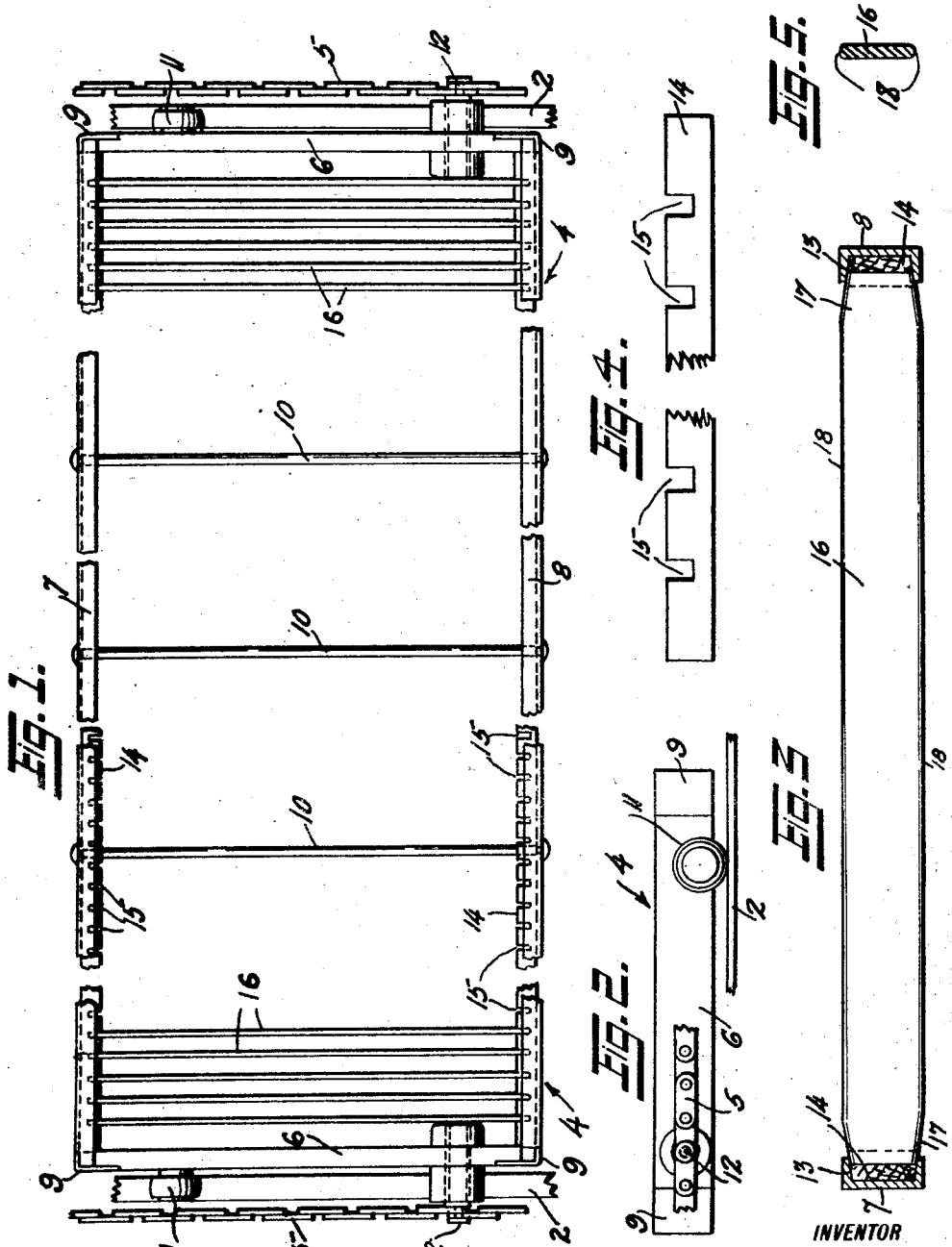
INVENTOR
Charles B. Latendorf
BY
Lewis J. Doolittle
ATTORNEY Patented Sept. 1, 1925.

1,552,319

UNITED STATES PATENT OFFICE.

CHARLES B. LATENDORF, OF CRANFORD, NEW JERSEY.

CONVEYER.

Application filed October 13, 1924. Serial No. 743,349.

*To all whom it may concern:*

Be it known that I, CHARLES B. LATENDORF, a citizen of the United States, and resident of Cranford, in the county of Union and State of New Jersey, have invented certain new and useful Improvements in Conveyers, of which the following is a specification.

This invention relates to conveyers, and especially to belt conveyers of a type adapted for conveying moist or heated articles, such as bread and the like, and its main object is the provision in a conveyer of this type of improved carrier members or units adapted to hold and move such articles under more sanitary conditions than has been possible with the conveyers heretofore used.

A purpose of the invention is to provide means for conveying bread and other bakery products from the oven without causing injury to such articles or discoloration thereof, without danger of contamination through contact with unsanitary apparatus, and without causing rusting or fouling of the parts on which such articles are carried. To prevent such unsightly and unsanitary conditions arising in a carrier, with its consequent menace to health when food products are to be conveyed, I have devised means adapted to overcome the above-mentioned defects, the means employed serving to add to the length of life of the apparatus, preventing discoloration of the articles conveyed, and removing the menace to health heretofore present because of unsanitary conditions attending the fouling and deterioration of those portions of the apparatus with which the articles conveyed must necessarily contact.

An object of the invention is to provide, in a conveyer of the class described, carrier members having article-carrying surfaces made up of a multiplicity of similar units, each of which units is readily insertible in position in the carrier member and adapted for quick removal therefrom in order to permit cleaning or replacement thereof.

A further object of the invention is to provide removable frame members adapted to carry and positively position the removable units forming the article-carrying surfaces of the carrier members.

The foregoing and other features of the invention not hereinbefore referred to will be hereinafter described and claimed and are illustrated in the accompanying drawing, in which:

Figure 1 is a plan view of a portion of an article conveyer embodying my invention;

Fig. 2 is an end elevation of the same;

Fig. 3 is a transverse section of a carrier member for the conveyer;

Fig. 4 is a plan view of a filler member designed to carry and position surface-forming units, and Fig. 5 is a transverse section of the surface-forming unit illustrated in Figs. 1 and 3.

Referring to the drawings, 2—2 designate portions of a track of an endless conveyer adapted to be actuated by suitable driving means (not shown). Said tracks 2—2 are adapted to have associated therewith a plurality of carriers, one of which is shown herein and designated generally by 4. Said carriers 4 are adapted to be moved along the tracks 2—2, chains 5—5, one at each end of the carrier 4 and connected with the source of power serving to effect this movement. Said carriers 4 are preferably formed of channel-iron and are here shown as of rectangular form, the end portions thereof being designated by 6—6 and the side portions by 7 and 8, suitable angle-irons 9 being employed to fasten said end and side portions together. To secure greater rigidity of the carrier 4, tie-rods 10, spaced at suitable intervals, may be employed. The carrier 4 shown and the other carriers of the series are adapted to move freely along the tracks 2—2, rollers 11 on said carriers permitting this freedom of movement, and said carrier 4 is also pivoted at 12—12 to the chains 5—5, thus permitting the edge 8 of the carrier to be lifted and lowered at desired points to effect gravitational transfer of articles from one carrier member 4 to another in the series.

Conveyers adapted for carrying articles of the class herein mentioned heretofore have been constructed entirely of metal, and all parts thereof have been permanently fixed in position. This has resulted in unsanitary conditions arising, particularly when the conveyer has been employed for moving moist or heated articles such as bread and other bakery products. The heat and consequent moisture arising from such articles has resulted, in the apparatus formerly used, in forming rust upon the carrying surfaces of the carriers and there has been no means devised heretofore to prevent this formation or to permit ready removal of the elements forming the carrying surface to permit cleaning of these parts of the conveyer most vitally affected. To provide a construction that will completely overcome this tendency to rusting and deterioration and which will be more sanitary and at the same time be made up of parts quickly and easily removable and as readily replaceable is the main object of the present invention. Realizing the disadvantages arising from the employment of oxidizable metal in positions where bread, etc., would be brought into contact therewith, applicant was impelled to devise means for overcoming this objection to the conveyers now in use for this purpose. The desired purpose has been accomplished by constructing the carrier members of channel-iron 7—8 of such cross-section that they form on the interior a wedging groove 13 into which may be driven a filler member 14, preferably of wood, this member 14 having slots 15 formed therein which preferably are evenly and similarly spaced and which extend throughout the length of the carrier, and are adapted to receive the surface-forming units of the apparatus.

The article-carrying surface for the carriers of conveyers of the type described herein has heretofore been formed ordinarily by the use of a wire or wires carried back and forth from one side of the carrier to the other to produce a grid-like carrying surface. Such wires are subject to oxidation and are not removable readily when it is desired to clean the various parts of the apparatus. Because of this, unsanitary condition of the conveyer was difficult to remedy.

In the present invention the article-carrying surface for a carrier 4 is formed by the employment of flexible slats, 16, preferably of wood and of such length and cross section that they may be sprung into position in the slots 15 and be positively held therein to form a continuous carrier surface for the articles to be conveyed. If, after continued operation of the conveyer these slats 16 have a tendency to become foul they may be sprung out of position in the slots 15 and then cleaned and returned. As the wedging members 14 also are preferably of wood and removable from the channel-irons 7—8, it will be apparent that a construction is presented that may be kept at all times in a sanitary condition.

The end portions 17 of the slats 16 are so shaped as to bring the level of each slat flush with the surface of the channel-irons 7—8 when the elements of the carrier surface are assembled, thus furnishing a flat surface for the articles to be conveyed. As the upper and lower faces of the channel-irons are alike in form and the slats 16 symmetrical and reversible, it will be clear that both the upper and the lower faces of each carrier unit is similar to the upper or the lower face of any other carrier unit, thus permitting both upper and lower faces to serve as carrying surfaces in turn. Each of the slats 16, it will be seen, is a somewhat thin, flat strip capable of being bent sufficiently by hand to permit insertion or removal thereof from the gripping slots 15 of the filler member 14. The upper and lower edges 18 of the slats 16 may be convexed to further assist in maintaining the sanitary condition of the carriers.

Preferably both the filler member 14 and the slats 16 will be of wood, this material meeting all the requirements in an extremely effective way, but any other materials may be used that are suitable for the purpose.

What I claim is:

1. A conveyer of the class described, embodying a plurality of carriers and driving means therefor, each of said carriers being formed with a rim portion having interior channels, filler members adapted to be wedged in said channels and each having a succession of slots formed therein, and flexible slats adapted to be sprung into and out of said slots and also adapted to be frictionally held therein.

2. A conveyer of the class described, embodying a plurality of carriers and driving means therefor, each of said carriers comprising a rim portion having interior channels, filler members adapted to be wedged in said channels and each having a succession of slots formed therein, and a flexible wooden slat adapted to be bent and sprung into each of said slots to form a carrier surface and also adapted to be frictionally held in said slots.

3. A conveyer of the class described, embodying a plurality of carriers and driving means therefor, each of said carriers comprising a frame portion opposite sides of which are formed with interior channels, filler members adapted to be wedged in said channels, opposite filler members being formed with complementary slots, and a flexible slat adapted to be sprung into each pair of complementary slots and wedged therein to form a carrier surface.

4. In a conveyer of the class described, a plurality of carriers and driving means therefor, each of said carriers comprising a rectangular frame portion opposite sides of which are formed with interior channels, wooden filler members adapted to be wedged in said channels, opposite filler members being provided with equally spaced complementary slots, and a wooden slat adapted to be sprung into each of said pairs of complementary slots and wedged therein to form a carrier surface, the carrying surface of each of said slats being convexed transversely.

5. A carrier for conveyers of the class described, embodying a frame formed with interior peripheral channels, wooden filler members adapted to be wedged in said channels, similarly and equally spaced slots in opposite filler members, and wooden slats each adapted to be sprung into complementary slots of opposite filler members and to be positioned and wedged therein to form an article-carrying surface.

6. A carrier for conveyers of the class described, embodying a frame formed with interior peripheral channels, wooden filler members adapted to be wedged in and removed from said channels, slots in opposite filler members, and wooden slats each adapted to be sprung into complementary slots of opposite filler members and wedged therein to form an article-carrying surface, each of said slats being reduced in width at their end portions and having rounded upper and lower edges.

Signed at New York, in the county of New York, and State of New York, this 26th day of September, A. D. 1924.

CHARLES B. LATENDORF.